United States Patent [19]
Guilhem et al.

[11] Patent Number: 4,935,743
[45] Date of Patent: Jun. 19, 1990

[54] ANTI-JAMMING APPARATUS AND METHOD FOR A RADAR SYSTEM

[75] Inventors: Robert Guilhem, Sceaux; Francois Muller, Wissous, both of France

[73] Assignee: Thomson CSF, Paris, France

[21] Appl. No.: 700,937

[22] Filed: Oct. 24, 1984

[30] Foreign Application Priority Data

Nov. 8, 1983 [FR] France ................. 83 17727

[51] Int. Cl.⁵ ............................ G01S 7/36; H04K 3/00
[52] U.S. Cl. ..................................... 342/17; 342/379
[58] Field of Search ............................ 343/18 E, 371; 342/13–16, 17, 379–384

[56] References Cited

U.S. PATENT DOCUMENTS

| | | | |
|---|---|---|---|
| 3,488,395 | 12/1969 | Soule et al. | 568/803 |
| 4,057,802 | 11/1977 | Dollinger | 342/379 |
| 4,075,633 | 2/1978 | Lewis | 342/381 |
| 4,107,682 | 8/1978 | Boucher et al. | 342/17 |
| 4,129,873 | 12/1978 | Kennedy | 342/380 |
| 4,146,889 | 3/1979 | Brennan et al. | 342/81 |
| 4,177,464 | 12/1979 | Masak | 342/380 |
| 4,298,873 | 11/1981 | Roberts | 342/375 |
| 4,313,116 | 1/1982 | Powell | 342/380 |
| 4,429,311 | 1/1984 | Barewald | 342/15 |
| 4,435,710 | 3/1984 | Powell | 342/16 |
| 4,544,925 | 10/1985 | Drabowitch et al. | 343/361 X |
| 4,571,594 | 2/1986 | Haupt | 342/379 X |
| 4,573,051 | 2/1986 | Farina | 343/384 X |
| 4,672,378 | 6/1987 | Drabowitch et al. | 342/17 |

FOREIGN PATENT DOCUMENTS

0098339 1/1984 European Pat. Off. .
2650547 of 0000 Fed. Rep. of Germany .

OTHER PUBLICATIONS

IEEE Transactions on Aerospace and Electronic Systems, vol. AES 16, No. 5, "A Combined Programmed and Adaptive Null Steering Technique", pp. 639–646.

Primary Examiner—Thomas H. Tarcza
Assistant Examiner—John B. Sotomayor
Attorney, Agent, or Firm—Cushman, Darby & Cushman

[57] ABSTRACT

Anti-jamming apparatus and method for a radar system having a main antenna utilizes a single electronic-scan auxiliary antenna having a plurality of radiating elements each coupled to appropriate phase shift means. The auxiliary antenna is successively sighted in directions of each of a plurality of jammers. First and second receiving chains respectively coupled to the main and auxiliary antennas supplies a processor with components of the signals received by the antennas. The computer supplies control signals to control the sighting of the auxiliary antenna so that it radiates in the direction of each jammer maximum radiation values, the components of which are those of the field radiated by the main antenna in the direction of the sighted jammer. The processor also provides an output signal comprising a vectorial combination of the signals received by the main and auxiliary antennas. The auxiliary antenna is thus successively used as an auxiliary adjusting antenna, and then used as an anti-jamming antenna.

14 Claims, 3 Drawing Sheets

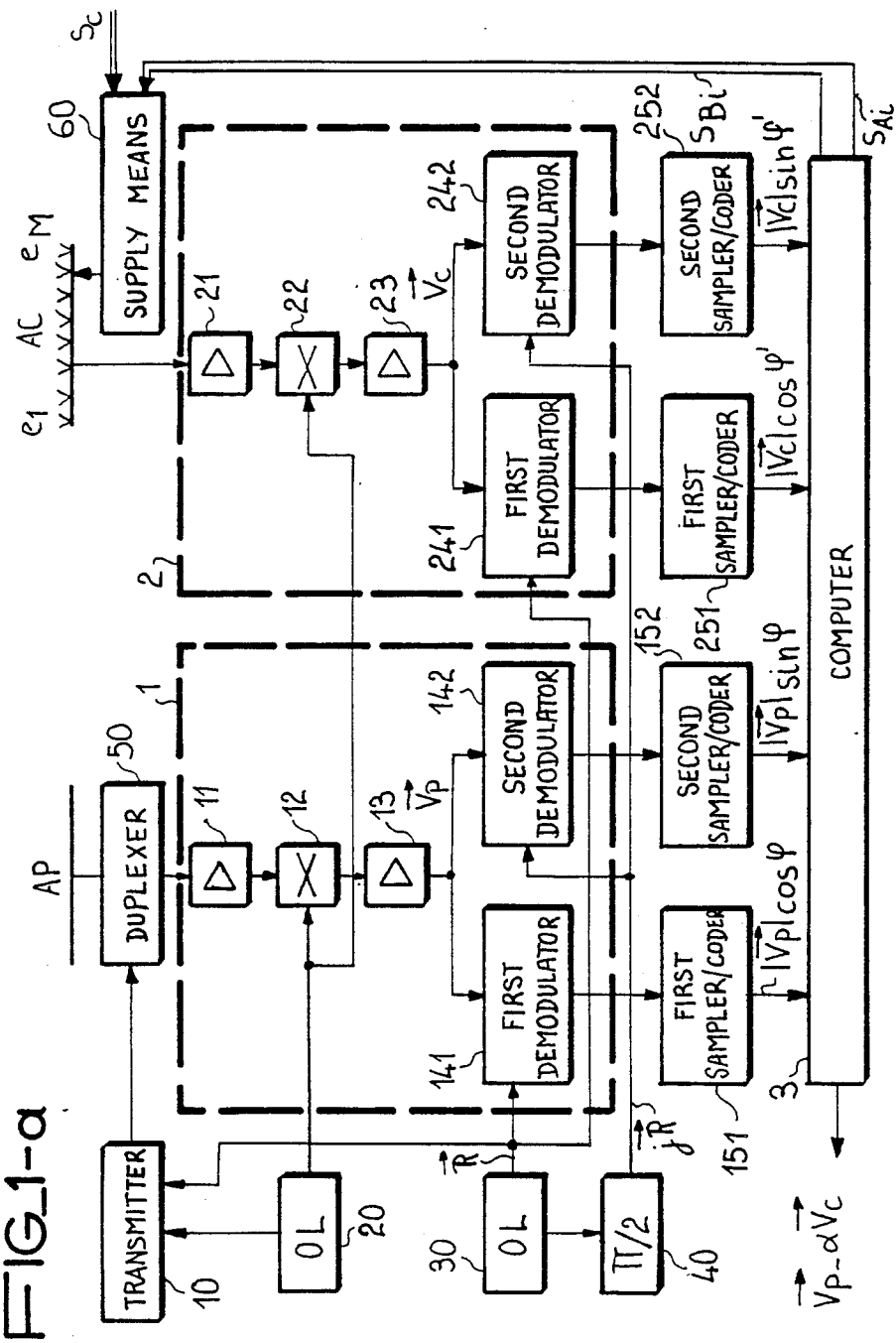

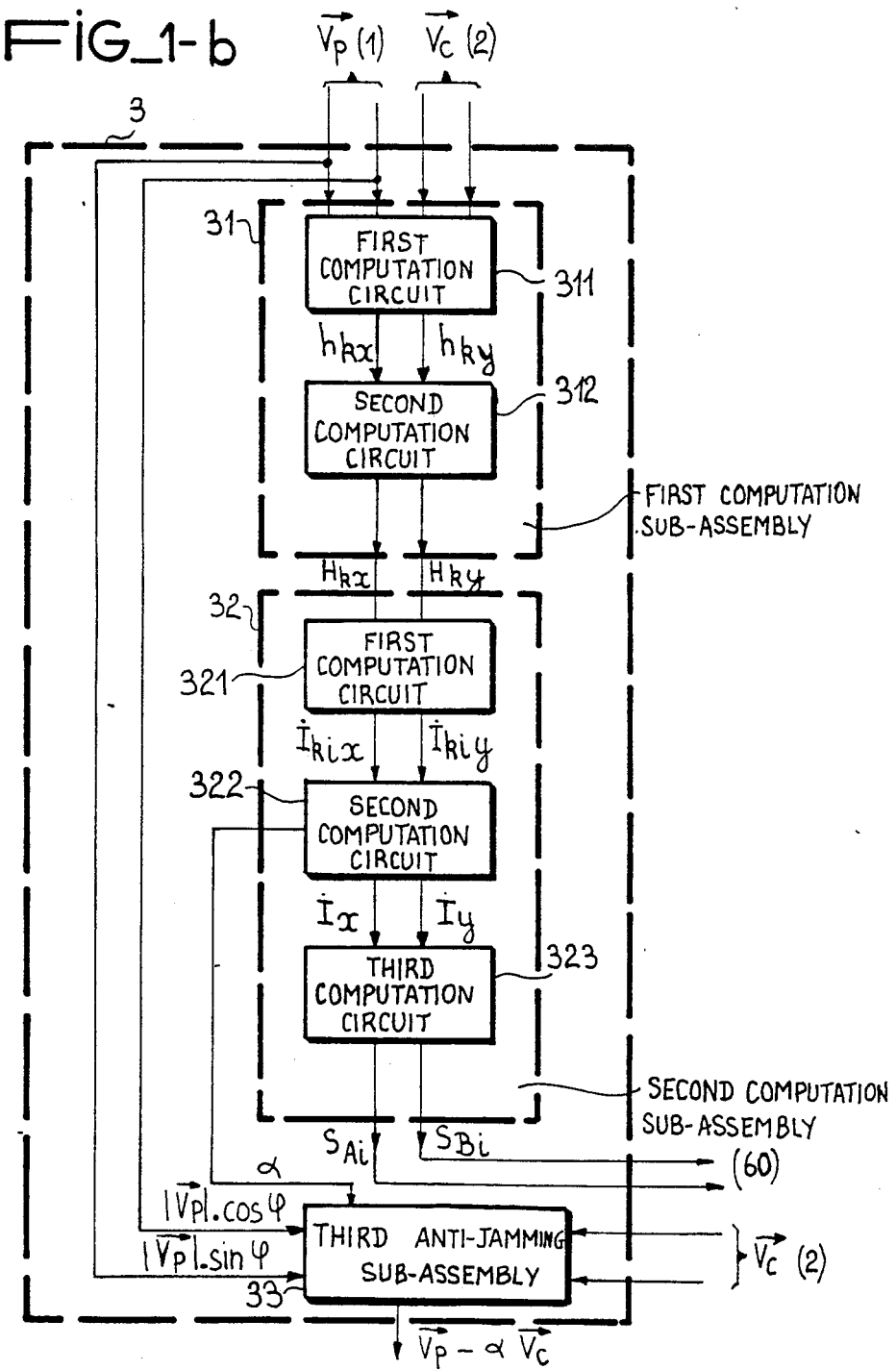
FIG_1-b

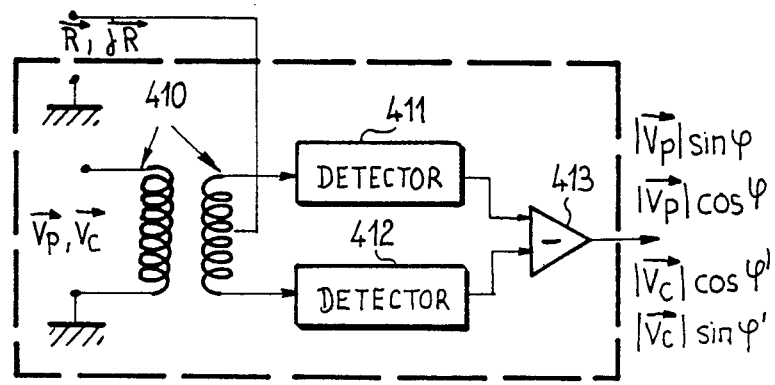
FIG_2
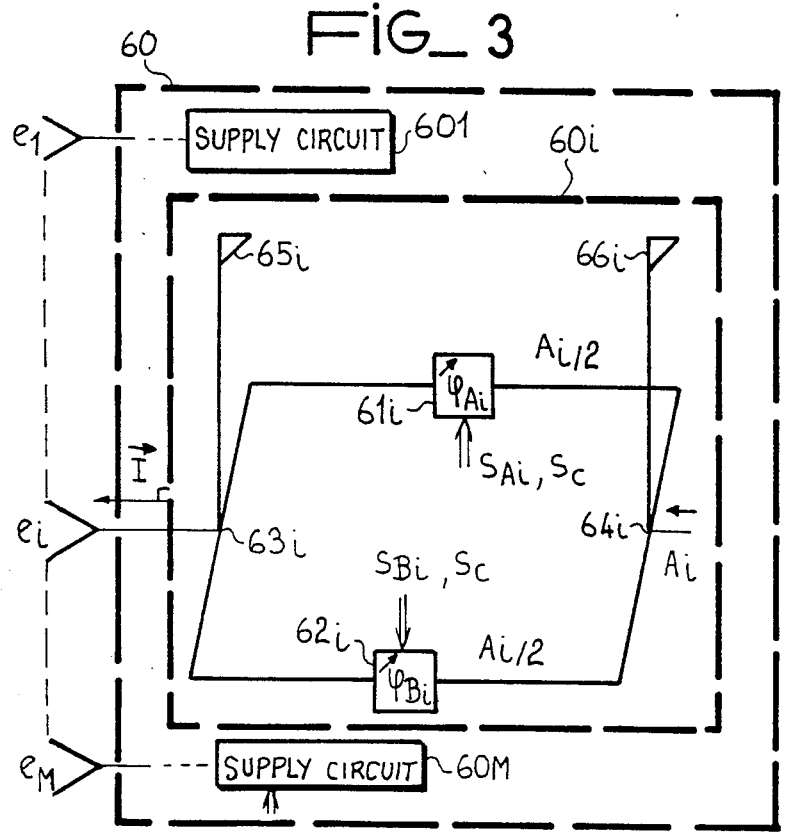
FIG_3

ANTI-JAMMING APPARATUS AND METHOD FOR A RADAR SYSTEM

BACKGROUND OF THE INVENTION

The invention relates to anti-jamming apparatus and method for radar. It also relates to a radar system equipped with such a device.

Modern military aircraft are usually equipped with jammers which emit noise signals within the frequency range of the radar systems capable of detecting their presence. Ground radars receiving these high-power signals, even on a minor lobe, are saturated and blinded.

A solution of the prior art for overcoming this disadvantage and compensating the active jamming noise involves using auxiliary antennas of sufficient numbers, in principle one for each jammer.

The signal field received by each auxiliary antenna is weighted in terms of amplitude and phase by means of a complex coefficient and is then added to the signal field received by the main antenna, so as to form a resultant signal field. Several known methods operating either in an open loop or in a closed loop make it possible to select the value of the complex coefficients correctly, so as to cancel the component of the said resultant field which arises from the jammers: this component is the sum of the field received by the main antenna and the weighted field received by each of the auxiliary antennas.

This known solution has the following disadvantages:

The auxiliary antennas cannot be very directional for reasons of bulk, because of their numbers, these being limited, moreover.

The anti-jamming principle used in this solution gives rise to a general raising of the diffuse pattern resulting from the linear combination of the fields received by the main and auxiliary antennas.

The number of jammers handled is limited by the number of auxiliary antennas: the arrival of a new jammer disturbs operation, since it cannot be handled and since it very likely arrives in a direction in which the diffuse pattern of the compensated antenna is considerable.

SUMMARY OF THE INVENTION

The anti-jamming apparatus and method according to the invention makes it possible to overcome the abovementioned disadvantages by associating with the jammed radar antenna a single auxiliary electronic-scan antenna which, in a first phase, is sighted successively in the direction of each of the jammers to compute the radiation of the radar antenna in the direction of the particular sighted jammer and, in a second phase, is used to produce a so-called compensation pattern which makes it possible to obtain a signal equal to that which the main radar antenna would have received without the presence of jammers, this being achieved by combining the signals received by the said main radar antenna and the radiating auxiliary electronic-scan antenna with the compensation pattern produced in this way.

The device according to the invention for the anti-jamming of a radar equipped with a radar antenna, called a main antenna, in the presence of a plurality of jammers is characterized in that, with an auxiliary electronic-scan antenna, called a balancing antenna, comprising a plurality of radiating elements, each supplied by phase-shift means, being associated with the main antenna, said device comprising:

means capable of sighting the balancing antenna in the direction of each of a plurality jammers in succession;

means for computing the components of the field radiated by the main antenna in the direction of a particular jammer sighted by the balancing antenna;

means for computing the law of illumination to be applied to the balancing antenna to obtain a radiation pattern which possesses, substantially in the direction of each of the jammers, a maximum the components of which are those of the field radiated by the main antenna in the direction of the said sighted jammer; and means for generating a signal corresponding to that which would be received by the main antenna in the absence of jammers, by carrying out the linear vectorial combination of the signal received by the main antenna, less the signal received by the balancing antenna, adjusted in the same way as the preceding stage so as to present a radiation pattern with maximum values in the direction of each of the jammers.

BRIEF DESCRIPTION OF THE DRAWINGS

The present invention will be understood better from a reading of the detailed description given below with reference to the attached Figures in which:

FIG. 1a shows a block diagram of the device according to the invention;

FIG. 1b shows a detailed embodiment of the computer which is part of the device of FIG. 1a;

FIG. 2 shows a detailed embodiment of a first circuit of the device of FIG. 1a; and FIG. 3 shows a detailed embodiment of another circuit of the device of FIG. 1a.

FIG. 1a illustrates the block diagram of the anti-jamming device according to the invention.

DETAILED DESCRIPTION OF THE PREFERRED EMBODIMENT

In the following description, AP denotes the main antenna which may or may not be an electronic-scan antenna and which is jammed by a plurality K of jammers.

AC likewise denotes an electronic-scan antenna, called a balancing antenna, which comprises, as illustrated in FIGS. 1a and 3, of a plurality M of radiating elements $e_1, \ldots, e_i, \ldots, e_M$ supplied respectively by circuits $601, \ldots, 60i, \ldots, 60M$ which together form the supply means 60. Each supply circuit $60i$, with i between 1 and M, comprises in a known way two controllable phase shifters $61i$ and $62i$, the phase shifts $\phi_{Ai}$ and $\phi_{Bi}$ of which are controlled respectively by signals $S_{Ai}$ and $S_{Bi}$ or an external control signal Sc and which are arranged in parallel between two hybrid couplers $63i$ and $64i$ represented in FIG. 3 by two magic T's charged at $65i$ and $66i$ respectively.

The radar system with which the main antenna AP is associated is not shown in full. It mainly comprises a transmitter 10 receiving the HF signal supplied by a first local oscillator 20 and a signal R of intermediate frequency which is supplied by a second local oscillator 30.

The signal provided by the transmitter 10 is supplied by means of a duplexer 50 to the main antenna AP which emits it and which, on reception, transmits the signal which it receives, likewise via the said duplexer 50, to a first receiving chain 1.

In the same way, the signal received by the balancing antenna AC controlled by the means 60 is applied to the input of a second receiving chain 2.

The first and second receiving chains 1, 2 are formed in an identical way from the following elements arranged in series:

a first amplifier 11, 21 respectively;

a mixer 12, 22 respectively, which receives at its second input the high-frequency signal supplied by the first local oscillator 20;

a second amplifier 13, 23 supplying a signal $v_p$, $v_c$ respectively;

a first and a second demodulator 141, 142 and 241, 242 respectively, which are supplied at a first input, in parallel, with the output signal from the second amplifier 13 and 23 respectively and at a second input with a reference signal formed, for the first demodulators 141, 241, by the intermediate-frequency signal R supplied by the second local oscillator 30. and, for the second demodulators 142, 242, by this same intermediate-frequency signal R phase-shifted $\frac{\pi}{2}$ by a circuit 40; the phase-shifted signal R is denoted by jR.

The receiving chains 1 and 2 are completed, for the purpose of digital processing, by samplers/coders 151, 152 and 251, 252 respectively, which are arranged in series with each of the first and second demodulators 141, 142 and 241, 242 respectively, and which each supply coded signals relating to N samples $|v_p|.\cos\phi$ and $|v_p|.\sin\phi$ respectively, $|v_c|.\cos\phi$, and $|v_c|.\sin\phi$, $\phi$ and $\phi'$ being the respective phases of $v_p$ and $v_c$ in relation to the reference R supplied by the second local oscillator 30.

A computer 3 receives the output signals from the first and second samplers/coders corresponding to the first and second receiving chains 1 and 2 respectively.

It executes a certain number of computations which assume that the following two conditions are satisfied:

the K jammers are sufficiently separated by the balancing antenna AC to make it possible to assume that the signal sample received by the said balancing antenna sighted in the direction of a jammer is attributable only to this single jammer;

the K jammers are completely uncorrelated, this practically always being the case.

The computer 3 has three outputs which respectively supply the signals $S_{Ai}$, $S_{Bi}$ controlling the supply phase shifters in the means 60 and a signal $v_p - \alpha v_c$ resulting from the vectorial combination of the signals supplied by the main antenna AP and the balancing antenna AC.

FIG. 1b illustrates a detailed diagram of the computer 3 according to a non-limiting embodiment:

This computer 3 comprises three computation sub-assemblies 31, 32 and 33:

The first sub-assembly 31 is composed of a first computation circuit 311 which is supplied with the signals provided by the samplers/coders 151, 152, and 251, 252 of the receiving chains 1 and 2 respectively and which computes the phase and quadrature components $h_{kx}$ and $h_{ky}$ of the radiation of the main antenna in the direction of each jammer of the order k (between 1 and K) sighted by the balancing antenna, these components being standardized in relation to the radiation of the said balancing antenna in the direction of the said jammer k. In the first sub-assembly 31, a second computation circuit 312 receives the standardized components $h_{kx}$ and $h_{ky}$ and supplies the standardized components $H_{kx}$ and $H_{ky}$ of the radiation $H_k$ of the main antenna, which are corrected as a function of the relative positions of the phase centers of the main antenna and balancing antenna.

The second sub-assembly 32 is composed of a first computation circuit 321 which, on the basis of the standardized and corrected components $H_{kx}$ and $H_{ky}$, computes the components $I_{kix}$ and $I_{kiy}$ of the field of illumination $I_{ki}$ of the radiating element of the order i (between 1 and M) of the balancing antenna AC for each jammer of the order k.

In the second sub-assembly 32, a second computation circuit 322 computes, from the components of the field of illumination $I_{ki}$, the components $I_{ix}$ and $I_{iy}$ of the field of illumination Ii of each radiating element i for all the K jammers, these components being standardized by a coefficient $\alpha$. A third computation circuit 323 supplies, from the components $I_{ix}$ and $I_{iy}$ (i between 1 and M) supplied by the second computation circuit 322, each pair of first and second control signals $S_{Ai}$ and $S_{Bi}$ of the respective supply circuits 60i composing the supply means 60.

The third computation sub-assembly 33 receives the signals $v_p$ and $v_c$ received by the main antenna AP and balancing antenna AC and the standardization coefficient $\alpha$ supplied by the second computation circuit 323 of the second sub-assembly 32 and computes the vectorial combination $v_p - \alpha v_c$ which constitutes the signal which the main antenna AP would have received in the absence of jammers.

FIG. 2 illustrates a detailed embodiment of a demodulator 141, 142, 241 or 242. Each demodulator possesses a transformer 410, the primary winding of which is fed with the signal $v_p$ (for the first and second demodulators 141, 142 of the first receiving chain 1), or $v_c$ (for the first and second demodulators 241, 242 of the second receiving chain 2) supplied by the output of the second amplifier 13 or 23.

The secondary winding of the transformer is fed at its center point with the intermediate-frequency signal R supplied by the second local oscillator 30 (for the first demodulators 141, 241) or with the signal jR supplied by the phase shifter 40 (for the second demodulators 142, 242).

The signals available at the first and second ends of the secondary winding of the transformer 410 respectively feed the positive and negative inputs of an amplifier 413 by means of a full-wave detector 411, 412 respectively. The amplifier 413 supplies a signal $|v_p|.\cos\phi$ for the first demodulator 141 of the first receiving chain 1, $|v_p|.\sin\phi$ for the second demodulator 142 of the first receiving chain 1, $|v_c|.\cos\phi'$ for the first demodulator 241 of the second receiving chain 2 or $|v_c|.\sin\phi'$ for the second demodulator 242 of the second receiving chain 2.

In response to its input signals $E_1$ (=R or jR) and $E_2$ (=$v_p$ or $v_c$), the demodulator of FIG. 2 carries out the following operation:

$$\left| E_1 + \frac{E_2}{2} \right| - \left| E_1 - \frac{E_2}{2} \right| = |E_2| \cdot \cos\phi o$$

(with $\phi o = \phi$ for $E_2 = v_p$ and $\phi o = \phi'$ for $E_2 = v_c$).

The device according to FIGS. 1a, 1b, 2 and 3 operates as follows:

Its operation comprises two successive phases, namely an adjusting phase and an anti-jamming phase.

During the adjusting phase, the device works as follows:

the balancing antenna AC controlled by the external control signal Sc is sighted successively in the direction of each of the K jammers;

for each sighted jammer of the order k between 1 and K, the computer 3 receives from the samplers/coders 151, 152, 251, 252 the N coded samples of each of the signals $|v_p|.\cos\phi$, $|v_p|.\sin\phi$, $|v_c|.\cos\phi'$, $|v_c|.\sin\phi'$ supplied by the demodulators 141, 142, 241 and 242 respectively;

for each sample of order n between 1 and N, the first computation circuit 311 of the first computation sub-assembly 31 in the computer 3 computes the following quantities which represent the phase component ($B_{knx}$) and quadrature component ($B_{kny}$) of the signal sample $B_{kn}$ received by the main antenna AP, related to a phase reference which is that, at receiver level, of the signal $B'_{kn}$ received by the balancing antenna AC sighting the jammer k:

$$\frac{B_{knx}}{B'_{kn}} = \frac{|v_p|}{|v_c|} \cdot \cos(\phi - \phi') = \frac{1}{|v_c|^2} [|v_p| \cdot \cos\phi \cdot$$

$$|v_c| \cdot \cos\phi' + |v_p| \cdot \sin\phi \cdot |v_c| \cdot \sin\phi']$$

$$\frac{B_{kny}}{B'_{kn}} = \frac{|v_p|}{|v_c|} \cdot \sin(\phi - \phi') = \frac{1}{|v_c|^2} [|v_p| \cdot \sin\phi \cdot$$

$$|v_c| \cdot \cos\phi' - |v_p| \cdot \cos\phi \cdot |v_c| \cdot \sin\phi']$$

The first computation circuit 311 computes the average, from the N samples, of the elementary phase and quadrature components $B_{knx}/B'_{kn}$ and $B_{kny}/B'_{kn}$ corresponding to the sample of order n.

On the assumption that the two conditions mentioned above are satisfied, namely the K jammers are separated by the balancing antenna AC and are uncorrelated, the averages obtained in this way constitute respectively the phase component (with the signal received by the antenna AC) $h_{kx}$ and quadrature component $h_{ky}$ of the radiation $H_k$ of the main antenna in the direction of the jammer of order k sighted by the antenna AC, these components $h_{kx}$ and $h_{ky}$ being the components standardized in relation to the radiation of the balancing antenna AC sighting the jammer k.

In practice, as regards a radar system having a passband of 10 MHz, the average of the elementary components of the signal received by the main antenna is taken from a number N=200 samples (1 every 50 ns).

Now this radiation of the balancing antenna sighted on the jammer k depends on the deflection in relation to the antenna axis. Furthermore, the phase reference of the radiation $H_k$, provided by the radiation of the balancing antenna AC, is linked to the phase center of the said balancing antenna. It is therefore necessary, in the computations, to take into account a phase shift $\Phi$ dependent on the relative position of the two antennas, namely the main antenna AP and the balancing antenna AC, and the deflection and defined in a known way by the expression:

$$\Phi = \frac{2\pi \cdot d}{\lambda} \cdot \sin\theta$$

In this expression, d denotes the vertical distance between the two phase centers, the antennas being assumed to be located on the same vertical axis, $\theta$ denotes the deflection angle in elevation and $\lambda$ denotes the transmission wavelength. The phase and quadrature components $H_{kx}$ and $H_{ky}$ respectively of the radiation $H_k$ of the main antenna AP, with the radiation of the balancing antenna AC in the direction of the particular jammer of order k and standardized in relation to the said radiation of the antenna AC, can consequently be expressed by:

$$H_{kx} = h_{kx} \cdot \cos\Phi + h_{ky} \cdot \sin\Phi$$

$$H_{ky} = -h_{kx} \cdot \sin\Phi + h_{ky} \cdot \cos\Phi$$

and are computed by the second computation circuit 312 of the first computation sub-assembly 31.

As already mentioned above, the aim is to obtain for the balancing antenna a radiation pattern which has, in the direction of each of the K jammers (k=1, ..., K), a maximum the components of which are $H_{kx}$ and $H_{ky}$, namely the components of the radiation $H_k$ of the main antenna AP in the direction of the jammer k. The field of illumination of the radiating element of order i between 1 and M is a modification in relation to an initial illumination of amplitude $A_i$ produced, for example, by means of illumination from a primary source.

If $\Psi_{ki}$ denotes the phase shift to be applied to the radiating element i for deflection in the direction of the jammer of order k, the modification $e^{j\Psi_{ki}}$ of the initial field of illumination of the radiating element of order i produces in the direction of the jammer k a radiation maximum in phase with the reference, for example the radiation of the element located at the phase center of the balancing antenna. The modification $j.e^{j\Psi_{ki}}$ produces a maximum in quadrature with the preceding maximum.

To produce a maximum of components $H_{kx}$ and $H_{ky}$ in the direction of the jammer k, the components $I_{kix}$ and $I_{kiy}$ of the modification of the field of illumination of the radiating element i, which are calculated by the first computation circuit 321 of the second sub-assembly 32, must be:

$$I_{kix} = H_{kx} \cdot \cos\Psi_{ki} - H_{ky} \cdot \sin\Psi_{ki}$$

$$I_{kiy} = H_{kx} \cdot \sin\Psi_{ki} + H_{ky} \cdot \cos\Psi_{ki}$$

For each radiating element of order i, the second computation circuit 322 of the second computation sub-assembly 32 executes the sum (from k=1 to k=K) of the components $I_{kix}$ and $I_{kiy}$ obtained for each of the jammers of order k:

To reduce as much as possible the attenuation of the M radiating elements as a whole, the second computation circuit 322 standardizes these components by means of the amplitude of the maximum field of illumination from those of the M different radiating elements.

$$\alpha = \underset{i}{\text{Max}} \left[ \left( \sum_{k=1}^{K} I_{kix} \right)^2 + \left( \sum_{k=1}^{K} I_{kiy} \right)^2 \right]^{\frac{1}{2}}$$

The standardized components of the field of illumination $I_i$ of the radiating element i are then:

$$I_{ix} = \frac{1}{\alpha} \cdot \sum_{k=1}^{K} I_{kix}$$

$$I_{iy} = \frac{1}{\alpha} \cdot \sum_{k=1}^{K} I_{kiy}$$

-continued with $$I_i = I_{ix} + jI_{iy}$$

When this field of illumination is known, the third computation circuit 323 of the second computation sub-assembly 32 must compute the values $\phi_{A1}$ and $\phi_{B1}$ of the phase shifts to be applied respectively to the phase shifters 61i and 62i of the supply circuit 60i of the radiating element of order i located between 1 and M.

The field of illumination $I_i$ of the element of order i is defined by its amplitude $I_i$ and its phase $\Phi_i$. It is equal to the sum of the fields supplied at the output of the phase shifters 61i and 62i coupled at 63i. They have Ai/2 for the amplitude and $\phi_{Ai}$ and $\phi_{Bi}$ for the phase respectively.

The following is therefore obtained:

$$I_i = I_i e^{j\Phi i} = Ai/2 \cdot [e^{j\phi Ai} + e^{j\phi Bi}]$$

These equations can be put in the following form:

$$I_i = I_i \cdot e^{j\Phi i} = Ai \cdot e^{j\left(\frac{\phi Ai + \phi Bi}{2}\right)} \cdot \cos\left(\frac{\phi Ai - \phi Bi}{2}\right)$$

This makes it possible to deduce the amplitude and the phase of the field of illumination $I_i$ as a function of $\phi_{Ai}$ and $\phi_{Bi}$ and of Ai, the power supplied at the input of the supply circuit 60i of the radiating element i, and consequently, conversely, the expression of the phase shifts $\phi_{Ai}$ and $\phi_{Bi}$ as a function of the power Ai, as well as of the amplitude $I_i$ and the phase $\Phi_i$ of the field of illumination $I_i$ of the radiating element of order i, this field having as standardized coordinates $I_{ix}$ and $I_{iy}$ computed by the computer 3 in the preceding computation step:

$$\phi_{Ai} = \Phi_i + \text{Arccos}\frac{I_i}{A_i}$$

$$\phi_{Bi} = \Phi_i - \text{Arccos}\frac{I_i}{A_i}$$

The values of the phase shifts $\phi_{Ai}$ and $\phi_{Bi}$ are represented by the control signals $S_{Ai}$ and $S_{Bi}$ respectively.

The second computation phase is the anti-jamming phase, as mentioned above:

The anti-jamming radiation pattern desired must have a very low radiation in the direction of each jammer. Since, in this case, the balancing antenna is supplied, as mentioned, in the adjusting phase described above, it radiates at a maximum substantially in the direction of each of the jammers. Thus, the signal, computed by the third computation sub-assembly 33 and formed by the combination $v_p - \alpha v_c$ of the signals $v_p$ which derives from the main antenna AP and $v_c$ which derives from the balancing antenna AC, taking into account the standardization value $\alpha$ of the components of the field of illumination of the balancing antenna, constitutes the signal which would be received by the main antenna AP in the absence of any jammer.

Without departing from the scope of the present invention, the combination of the signals received by the main antenna and balancing antenna can be made in analog form, in which case the computer 3 is reduced to the first and second computation sub-assemblies 31 and 32 (corresponding to the adjusting phase).

The description has thus related to an anti-jamming method and device for a main radar antenna, based on the addition of a single electronic-scan antenna used successively as an auxiliary adjusting antenna and then as an anti-jamming antenna. The main antenna can be equally a mechanical-scan or electronic-scan antenna.

We claim:

1. An anti-jamming device for a radar system having a main antenna and a first receiving chain for receiving and processing a received signal $v_p$, for reducing the effects of a plurality K of jammers, comprising a single electronic-scan auxiliary antenna having a plurality of radiating elements;

a second receiving chain for receiving and processing a signal $v_c$ received by the said auxiliary antenna;

supply means for each of the radiating elements, said supply means being controlled by an external signal Sc and/or by a first and a second control signal $S_{Ai}$, $S_{Bi}$ supplied by the said anti-jamming device, for sighting said auxiliary antenna successively towards each of said K jammers, and for making the said auxiliary antenna radiate according to a specific pattern;

first means for computing components $H_{kx}$, $H_{ky}$ of a field $H_k$ radiated by said main antenna in the direction of each jammer of order k, k being between 1 and k, from the signals $v_p$, $v_c$ respectively received by said main antenna and said auxiliary antenna;

second means for computing said control signals $S_{Ai}$, $S_{Bi}$ of the supply means corresponding to each radiating element $e_i$ of order, i being between 1 and M, to obtain a radiation diagram which has, in the direction of each jammer, a maximum, components of which are those components $H_{kx}$, $H_{ky}$ of the field $H_k$ radiated by the main antenna in the direction of the said each jammer which were computed by said first means for computing; and third means for generating a signal corresponding to that which would be received by said main antenna in the absence of jammers and which is equal to a linear vectorial combination of the signal $v_p$ received by the main antenna, less the signal $v_c$ received by the auxiliary antenna when the said auxiliary antenna has a radiation pattern computed by the second means for computing.

2. An anti-jamming device as claimed in claim 1, further including sampler/coder means, disposed between said first and second receiving chains, for receiving and processing the signals $v_p$, $v_c$ received by the main and auxiliary antennas and said first means for computing.

3. An anti-jamming device as claimed in claim 1 further including first and second local oscillators, and wherein said first and second receiving chains each comprises in series:

an amplifier;

a mixer which receives a high-frequency signal from said first local oscillator;

a second amplifier; and demodulation means which are fed with an intermediate-frequency signal supplied by said second local oscillator, for providing phase and quadrature components of one of said signals $v_p$, $v_c$ received by the main and auxiliary antennas, respectively.

4. An anti-jamming device as claimed in claim 1 wherein said supply means includes a plurality M of supply circuits for M radiating elements respectively, each supply circuit incorporating a first and a second controllable phase shifter, the phase shifts $\phi_{Ai}$, $\phi_{Bi}$ of which are controlled by the first and second control signals $S_{Ai}$, $S_{Bi}$ respectively provided by said second means for computing and/or the external control signal $S_c$, said phase shifters being fed from an initial field Ai and arranged in parallel between two hybrid couplers.

5. An anti-jamming device as claimed in claim 2, wherein said first means for computing comprises in series:
   a first computation circuit which receives sampled and coded components of the signals $v_p$, $v_c$, said sampled and coded components being provided by said sample/coder means, and which supplies components of the radiation pattern of said main antenna in the direction of each jammer of order k, k being between 1 and K;
   a second computation circuit which corrects the said components supplied by said first computation circuit as a function of a relative position of phase centers of said main and auxiliary antennas.

6. An anti-jamming device as claimed in claim 2, wherein said second means for computing comprises in series:
   a first computation circuit which, from the components calculated by said first means for computing, computes components of a field of illumination $I_{ki}$ of each radiating element $e_i$ of order, i being between 1 and M, for each jammer of order, k being between 1 and K;
   a second computation circuit which computes components of a field of illumination $I_i$ of each radiating element $e_i$ of order for all the K jammers, by summing the components computed by said first computation circuit for said each radiating element; and
   a third computation circuit which computes said control signals $S_{Ai}$, $S_{Bi}$ to be applied to said supply means for each radiating element, so that said each radiating element has a field of illumination the components of which are those computed by said second computation circuit.

7. An anti-jamming device for a radar system having a main antenna, for reducing the effects of a plurality of jammers, comprising:
   a single electronic-scan auxiliary antenna having a plurality of radiating elements each having associated phase shift means;
   means for successively sighting said auxiliary antenna in directions of each of said plurality of jammers; and
   processing means for (a) computing components of a signal field illuminated by said main antenna in the direction of each jammer sighted by said auxiliary antenna; (b) computing an illumination law for said auxiliary antenna to obtain a radiation pattern which has, in the direction of each sighted jammer, a maximum, components of which are said components of said field illuminated by said main antenna in said direction of each sighted jammer; and (c) generating an output signal corresponding to a signal which would be received by said main antenna in the absence of said jammers, by forming a linear vectorial combination of the signal received by said main antenna less the signal received by said auxiliary antenna adjusted so as to have a radiation pattern with maximum values in the direction of each said sighted jammer.

8. An anti-jamming device as claimed in claim 7, wherein said processing means for (a) computing components comprises:
   means for demodulating the signals received by the main antenna and the auxiliary antenna for each sighting of said auxiliary antenna by means of an intermediate-frequency signal so as to obtain components of the said signals received;
   means for sampling the said components obtained by said modulating means;
   means for computating, for each sample, components of the signal received by said main antenna, said components related to a phase reference supplied by the signal received by said auxiliary antenna when sighted in the direction of the jammer in question; and
   means for computing an average of the said components over all samples, for each sighting.

9. An anti-jamming device as claimed in claim 7, wherein said processing means for (b) computing said illumination law for said auxiliary antenna comprises:
   means for computating, for each radiating element in said auxiliary antenna, for each sighting, a correction of an initial field of illumination of said each element, so that said each element deflects in the direction of the jammer in question, and for producing in the direction of the said jammer in question a radiation maximum, the corrected components of which are the components of the field of illumination of the main antenna which were computed by said processing means for (a) computing:
   means for computing, for each radiating element, a respective sum of the corrected components of the field of illumination of the auxiliary antenna which are obtained for all the jammers sighted in succession by the said auxiliary antenna; and
   means for computating phase shifts to be applied to the phase-shift means of said each radiating element so that it radiates a field the components of which are the sum of the corrected components calculated by said means for computing said sum.

10. An anti-jamming device as claimed in claim 9, further including means for standardizing said sums of said corrected components, before the computation of the phase shifts by means of an amplitude of a maximum field of illumination from illumination fields computed in succession for all the radiating elements of the auxiliary antenna.

11. An anti-jamming method for a radar system having a main antenna, for reducing the effects of a plurality of jammers, comprising the steps of:
   coupling to said radar system a single electronic-scan auxiliary antenna having a plurality of radiating elements each having associated phase shift means;
   successively sighting said auxiliary antenna in directions of each of said plurality of jammers;
   computing components of a signal field illuminated by said main antenna in the direction of each jammer sighted by said auxiliary antenna;
   computing an illumination law for said auxiliary antenna to obtain a radiation pattern which has, in the direction of each sighted jammer, a maximum, components of which are said components of said field illuminated by said main antenna in said direction of each sighted jammer; and
   generating an output signal corresponding to a signal which would be received by said main antenna in the absence of said jammers, by forming a linear vectorial combination of the signal received by said main antenna less the signal received by said auxiliary antenna adjusted so as to have a radiation pattern with maximum values in the direction of each said sighted jammer.

12. A method according to claim 11 wherein said step of computing components includes the following successive steps, for each sighting of said auxiliary antenna:

demodulating signals received by said main antenna and said auxiliary antenna by use of an intermediate frequency signal to obtain components of the received signals;

sampling the said components;

computing the components of the signal received by said main antenna, said components related to a phase reference supplied by the signal received by said auxiliary antenna when sighted in the direction of the jammer in question; and computing an average of the said components over all sightings.

13. A method according to claim 11 wherein said step of computing said illumination law includes the following successive steps, for each radiating element of said auxiliary antenna;

computing a correction of an initial field of illumination of said each element so that said each element deflects in the direction of the jammer in question, and producing in the direction of the said jammer in question a radiation maximum, the corrected components of which are the components of the field of illumination of said main antenna which were computed in said step of computing components;

computing a respective sum of the corrected components of the field of illumination of the auxiliary antenna which are obtained for all jammers sighted in succession by the said auxiliary antenna; and computing phase shifts to be applied to the phase shift means of said each radiating element so that said each radiating element radiates a field, the components of which are in sum of the corrected components calculated in said step of computing said sum.

14. A method according to claim 13 further including the step of standardizing said sum of said corrected components before the computation of the phase shifts by means of an amplitude of a maximum field of illumination from illumination fields computed in succession for all said radiating elements of said auxiliary antenna.

* * * * *